(12) United States Patent
Reed

(10) Patent No.: US 9,985,429 B2
(45) Date of Patent: May 29, 2018

(54) INRUSH CURRENT LIMITER CIRCUIT

(71) Applicant: Express Imaging Systems, LLC, Renton, WA (US)

(72) Inventor: William G. Reed, Seattle, WA (US)

(73) Assignee: Express Imaging Systems, LLC, Renton, WA (US)

( * ) Notice: Subject to any disclaimer, the term of this patent is extended or adjusted under 35 U.S.C. 154(b) by 0 days. days.

(21) Appl. No.: 15/709,028

(22) Filed: Sep. 19, 2017

(65) Prior Publication Data

US 2018/0083438 A1     Mar. 22, 2018

Related U.S. Application Data

(60) Provisional application No. 62/397,713, filed on Sep. 21, 2016.

(51) Int. Cl.
| | | |
|---|---|---|
| *H02H 9/00* | (2006.01) | |
| *H02H 1/04* | (2006.01) | |
| *H05B 33/08* | (2006.01) | |

(52) U.S. Cl.
CPC ............ *H02H 9/001* (2013.01); *H02H 1/043* (2013.01); *H05B 33/0887* (2013.01)

(58) Field of Classification Search
CPC .......... H02H 9/001; H02H 9/002; H02H 9/02; H02H 9/026; H02H 9/0266; H02H 1/043;
(Continued)

(56) References Cited

U.S. PATENT DOCUMENTS

| | | |
|---|---|---|
| 2,240,050 A | 4/1941 | Nuebling |
| 2,745,055 A | 5/1956 | Woerdemann |

(Continued)

FOREIGN PATENT DOCUMENTS

| | | |
|---|---|---|
| CN | 103162187 A | 6/2013 |
| DE | 40 01 980 A1 | 8/1990 |

(Continued)

OTHER PUBLICATIONS

"Lcd Backlight I/O Ports and Power Protection Circuit Design," dated May 2, 2011, retrieved Jun. 10, 2011, from http://www.chipoy.info/gadgets/lcd-backlight-i-o-ports-and-power-pr . . . , 4 pages.

(Continued)

*Primary Examiner* — Haissa Philogene
(74) *Attorney, Agent, or Firm* — Seed IP Law Group LLP

(57) ABSTRACT

Systems and methods for reducing inrush current into a component, such as a power converter (e.g., LED driver), which receives alternating current (AC) power from an AC power source (e.g., AC mains). The method may include pre-charging the input capacitance of a component or circuit for a determined period of time after closing of a control switch (e.g., photocontrol, contactor) using a capacitive load pre-charge circuit (e.g., resistor), and then shorting the capacitive load pre-charge circuit using a bidirectional AC switch coupled in parallel with the capacitive load pre-charge circuit after the determined period of time to selectively bypass the capacitive load pre-charge circuit. The bidirectional AC switch may include two source-connected metal oxide semiconductor field-effect transistors (MOSFETs) which have a very low "on resistance," such that during steady-state operation, the protection circuit wastes very little power compared to conventional inrush protection circuits.

26 Claims, 3 Drawing Sheets

(58) Field of Classification Search
CPC ............ H02J 7/0018; H02J 2007/0039; Y10T 307/747; H05B 33/0887; H05B 37/02
See application file for complete search history.

(56) References Cited

U.S. PATENT DOCUMENTS

| | | |
|---|---|---|
| 3,374,396 A | 3/1968 | Bell et al. |
| 4,153,927 A | 5/1979 | Owens |
| 4,237,377 A | 12/1980 | Sansum |
| 4,663,521 A | 5/1987 | Maile |
| 5,086,379 A | 2/1992 | Denison et al. |
| 5,160,202 A | 11/1992 | Légaré |
| 5,161,107 A | 11/1992 | Mayeaux et al. |
| 5,230,556 A | 7/1993 | Canty et al. |
| 5,276,385 A | 1/1994 | Itoh et al. |
| 5,343,121 A | 8/1994 | Terman et al. |
| 5,349,505 A | 9/1994 | Poppenheimer |
| 5,450,302 A | 9/1995 | Maase et al. |
| 5,561,351 A | 10/1996 | Vrionis et al. |
| 5,589,741 A | 12/1996 | Terman et al. |
| 5,808,294 A | 9/1998 | Neumann |
| 5,838,226 A | 11/1998 | Houggy et al. |
| 5,869,960 A | 2/1999 | Brand |
| 5,892,331 A | 4/1999 | Hollaway |
| 5,892,335 A | 4/1999 | Archer |
| 5,894,396 A * | 4/1999 | Kim ................ H05B 6/6417 361/103 |
| 5,936,362 A | 8/1999 | Alt et al. |
| 5,995,350 A | 11/1999 | Kopelman |
| 6,111,739 A | 8/2000 | Wu et al. |
| 6,149,283 A | 11/2000 | Conway et al. |
| 6,154,015 A | 11/2000 | Ichiba |
| 6,160,353 A | 12/2000 | Mancuso |
| 6,198,233 B1 | 3/2001 | McConaughy |
| 6,211,627 B1 | 4/2001 | Callahan |
| 6,335,654 B1 * | 1/2002 | Cole ................ G05F 1/565 323/273 |
| 6,377,191 B1 | 4/2002 | Takubo |
| 6,612,720 B1 | 9/2003 | Beadle |
| 6,674,060 B2 | 1/2004 | Antila |
| 6,681,195 B1 | 1/2004 | Poland et al. |
| 6,746,274 B1 | 6/2004 | Verfuerth |
| 6,753,842 B1 | 6/2004 | Williams et al. |
| 6,828,911 B2 | 12/2004 | Jones et al. |
| 6,841,947 B2 | 1/2005 | Berg-johansen |
| 6,880,956 B2 | 4/2005 | Zhang |
| 6,902,292 B2 | 6/2005 | Lai |
| 6,985,827 B2 | 1/2006 | Williams et al. |
| 7,019,276 B2 | 3/2006 | Cloutier et al. |
| 7,066,622 B2 | 6/2006 | Alessio |
| 7,081,722 B1 | 7/2006 | Huynh et al. |
| 7,122,976 B1 | 10/2006 | Null et al. |
| 7,188,967 B2 | 3/2007 | Dalton et al. |
| 7,190,121 B2 | 3/2007 | Rose et al. |
| 7,196,477 B2 | 3/2007 | Richmond |
| 7,239,087 B2 | 7/2007 | Ball |
| 7,252,385 B2 | 8/2007 | Engle et al. |
| 7,258,464 B2 | 8/2007 | Morris et al. |
| 7,270,441 B2 | 9/2007 | Fiene |
| 7,281,820 B2 | 10/2007 | Bayat et al. |
| 7,294,973 B2 | 11/2007 | Takahama et al. |
| 7,314,291 B2 | 1/2008 | Tain et al. |
| 7,317,403 B2 | 1/2008 | Grootes et al. |
| 7,322,714 B2 | 1/2008 | Barnett et al. |
| 7,330,568 B2 | 2/2008 | Nagaoka et al. |
| 7,339,323 B2 | 3/2008 | Bucur |
| 7,339,471 B1 | 3/2008 | Chan et al. |
| 7,405,524 B2 | 7/2008 | Null et al. |
| 7,438,440 B2 | 10/2008 | Dorogi |
| 7,440,280 B2 | 10/2008 | Shuy |
| 7,468,723 B1 | 12/2008 | Collins |
| 7,524,089 B2 | 4/2009 | Park |
| 7,538,499 B2 | 5/2009 | Ashdown |
| 7,547,113 B2 | 6/2009 | Lee |
| 7,559,674 B2 | 7/2009 | He et al. |
| 7,564,198 B2 | 7/2009 | Yamamoto et al. |
| 7,569,802 B1 | 8/2009 | Mullins |
| 7,578,596 B2 | 8/2009 | Martin |
| 7,578,597 B2 | 8/2009 | Hoover et al. |
| 7,623,042 B2 | 11/2009 | Huizenga |
| 7,627,372 B2 | 12/2009 | Vaisnys et al. |
| 7,631,324 B2 | 12/2009 | Buonasera et al. |
| 7,633,463 B2 | 12/2009 | Negru |
| 7,638,743 B2 | 12/2009 | Bartol et al. |
| 7,665,862 B2 | 2/2010 | Villard |
| 7,677,753 B1 | 3/2010 | Wills |
| 7,688,002 B2 | 3/2010 | Ashdown et al. |
| 7,688,222 B2 | 3/2010 | Peddie et al. |
| 7,702,135 B2 | 4/2010 | Hill et al. |
| 7,703,951 B2 | 4/2010 | Piepgras et al. |
| 7,746,003 B2 | 6/2010 | Verfuerth et al. |
| D621,410 S | 8/2010 | Verfuerth et al. |
| D621,411 S | 8/2010 | Verfuerth et al. |
| 7,798,669 B2 | 9/2010 | Trojanowski et al. |
| 7,804,200 B2 | 9/2010 | Flaherty |
| 7,828,463 B1 | 11/2010 | Willis |
| 7,834,922 B2 | 11/2010 | Kurane |
| 7,872,423 B2 | 1/2011 | Biery et al. |
| 7,932,535 B2 | 4/2011 | Mahalingam et al. |
| 7,940,191 B2 | 5/2011 | Hierzer |
| 7,952,609 B2 | 5/2011 | Simerly et al. |
| 7,960,919 B2 | 6/2011 | Furukawa |
| 7,983,817 B2 | 7/2011 | Breed |
| 7,985,005 B2 | 7/2011 | Alexander et al. |
| 8,100,552 B2 | 1/2012 | Spero |
| 8,118,456 B2 | 2/2012 | Reed et al. |
| 8,143,769 B2 | 3/2012 | Li |
| 8,174,212 B2 | 5/2012 | Tziony et al. |
| 8,183,797 B2 | 5/2012 | McKinney |
| 8,207,830 B2 | 6/2012 | Rutjes et al. |
| 8,260,575 B2 | 9/2012 | Walters et al. |
| 8,290,710 B2 | 10/2012 | Cleland et al. |
| 8,305,783 B2 * | 11/2012 | Rizzo ................ H02H 9/001 363/53 |
| 8,324,840 B2 | 12/2012 | Shteynberg et al. |
| 8,334,640 B2 | 12/2012 | Reed et al. |
| 8,344,665 B2 | 1/2013 | Verfuerth et al. |
| 8,376,583 B2 | 2/2013 | Wang et al. |
| 8,378,563 B2 | 2/2013 | Reed et al. |
| 8,395,329 B2 | 3/2013 | Jutras et al. |
| 8,445,826 B2 | 5/2013 | Verfuerth |
| 8,450,670 B2 | 5/2013 | Verfuerth et al. |
| 8,457,793 B2 | 6/2013 | Golding et al. |
| 8,476,565 B2 | 7/2013 | Verfuerth |
| 8,508,137 B2 | 8/2013 | Reed |
| 8,541,950 B2 | 9/2013 | Reed |
| 8,586,902 B2 | 11/2013 | Verfuerth |
| 8,604,701 B2 | 12/2013 | Verfuerth et al. |
| 8,610,358 B2 | 12/2013 | Reed |
| 8,629,621 B2 | 1/2014 | Reed |
| 8,749,635 B2 | 6/2014 | Högasten et al. |
| 8,764,237 B2 | 7/2014 | Wang et al. |
| 8,779,340 B2 | 7/2014 | Verfuerth et al. |
| 8,779,686 B2 | 7/2014 | Jin |
| 8,810,138 B2 | 8/2014 | Reed |
| 8,866,392 B2 | 10/2014 | Chen |
| 8,866,582 B2 | 10/2014 | Verfuerth et al. |
| 8,872,964 B2 | 10/2014 | Reed et al. |
| 8,878,440 B2 | 11/2014 | Reed |
| 8,884,203 B2 | 11/2014 | Verfuerth et al. |
| 8,896,215 B2 | 11/2014 | Reed et al. |
| 8,901,825 B2 | 12/2014 | Reed |
| 8,921,751 B2 | 12/2014 | Verfuerth |
| 8,922,124 B2 | 12/2014 | Reed et al. |
| 8,926,138 B2 | 1/2015 | Reed et al. |
| 8,926,139 B2 | 1/2015 | Reed et al. |
| 8,975,827 B2 | 3/2015 | Chobot et al. |
| 8,987,992 B2 | 3/2015 | Reed |
| 9,002,522 B2 | 4/2015 | Mohan et al. |
| 9,024,545 B2 | 5/2015 | Bloch et al. |
| 9,084,310 B2 | 7/2015 | Bedell et al. |
| 9,119,270 B2 | 8/2015 | Chen et al. |
| 9,136,698 B2 * | 9/2015 | Sharma ................ H02H 9/001 |
| 9,185,777 B2 | 11/2015 | Reed |

(56) References Cited

U.S. PATENT DOCUMENTS

| | | | |
|---|---|---|---|
| 9,204,523 B2 | 12/2015 | Reed et al. |
| 9,210,751 B2 | 12/2015 | Reed |
| 9,210,759 B2 | 12/2015 | Reed |
| 9,288,873 B2 | 3/2016 | Reed |
| 9,414,449 B2 | 8/2016 | Reed |
| 9,450,347 B2 | 9/2016 | Kondou et al. |
| 9,462,662 B1 | 10/2016 | Reed |
| 9,466,443 B2 | 10/2016 | Reed |
| 9,693,433 B2 | 6/2017 | Reed et al. |
| 9,713,228 B2 | 7/2017 | Reed |
| 9,781,797 B2 | 10/2017 | Reed |
| 9,801,248 B2 | 10/2017 | Reed et al. |
| 2002/0084767 A1 | 7/2002 | Arai |
| 2003/0016143 A1 | 1/2003 | Ghazarian |
| 2003/0184672 A1 | 10/2003 | Wu et al. |
| 2004/0192227 A1 | 9/2004 | Beach et al. |
| 2005/0117344 A1 | 6/2005 | Bucher et al. |
| 2005/0174762 A1 | 8/2005 | Fogerlie |
| 2005/0179404 A1 | 8/2005 | Veskovic et al. |
| 2005/0231133 A1 | 10/2005 | Lys |
| 2006/0014118 A1 | 1/2006 | Utama |
| 2006/0066264 A1 | 3/2006 | Ishigaki et al. |
| 2006/0098440 A1 | 5/2006 | Allen |
| 2006/0133079 A1 | 6/2006 | Callahan |
| 2006/0146652 A1 | 7/2006 | Huizi et al. |
| 2006/0208667 A1 | 9/2006 | Lys et al. |
| 2007/0032990 A1 | 2/2007 | Williams et al. |
| 2007/0102033 A1 | 5/2007 | Petrocy |
| 2007/0164689 A1 | 7/2007 | Suzuki |
| 2007/0224461 A1 | 9/2007 | Oh |
| 2007/0225933 A1 | 9/2007 | Shimomura |
| 2008/0018261 A1 | 1/2008 | Kastner |
| 2008/0025020 A1 | 1/2008 | Kolb |
| 2008/0043106 A1 | 2/2008 | Hassapis et al. |
| 2008/0062687 A1 | 3/2008 | Behar et al. |
| 2008/0130304 A1 | 6/2008 | Rash et al. |
| 2008/0215279 A1 | 9/2008 | Salsbury et al. |
| 2008/0224623 A1 | 9/2008 | Yu |
| 2008/0232116 A1 | 9/2008 | Kim |
| 2008/0248837 A1 | 10/2008 | Kunkel |
| 2008/0266839 A1 | 10/2008 | Claypool et al. |
| 2009/0046151 A1 | 2/2009 | Nagaoka et al. |
| 2009/0058320 A1 | 3/2009 | Chou et al. |
| 2009/0153062 A1 | 6/2009 | Guo et al. |
| 2009/0160358 A1 | 6/2009 | Leiderman |
| 2009/0161356 A1 | 6/2009 | Negley et al. |
| 2009/0167203 A1 | 7/2009 | Dahlman et al. |
| 2009/0195179 A1 | 8/2009 | Joseph et al. |
| 2009/0230883 A1 | 9/2009 | Haug |
| 2009/0235208 A1 | 9/2009 | Nakayama et al. |
| 2009/0261735 A1 | 10/2009 | Sibalich et al. |
| 2009/0268023 A1 | 10/2009 | Hsieh |
| 2009/0273290 A1 | 11/2009 | Ziegenfuss |
| 2009/0278479 A1 | 11/2009 | Planter et al. |
| 2010/0001652 A1 | 1/2010 | Damsleth |
| 2010/0052557 A1 | 3/2010 | Van Der Veen et al. |
| 2010/0096460 A1 | 4/2010 | Carlson et al. |
| 2010/0123403 A1 | 5/2010 | Reed |
| 2010/0164406 A1 | 7/2010 | Kost et al. |
| 2010/0171442 A1 | 7/2010 | Draper et al. |
| 2010/0237711 A1 | 9/2010 | Parsons |
| 2010/0244708 A1 | 9/2010 | Cheung et al. |
| 2010/0259193 A1 | 10/2010 | Umezawa et al. |
| 2010/0270945 A1 | 10/2010 | Chang et al. |
| 2010/0271802 A1 | 10/2010 | Recker et al. |
| 2010/0309310 A1 | 12/2010 | Albright |
| 2010/0328946 A1 | 12/2010 | Borkar et al. |
| 2011/0001626 A1 | 1/2011 | Yip et al. |
| 2011/0006703 A1 | 1/2011 | Wu et al. |
| 2011/0026264 A1 | 2/2011 | Reed et al. |
| 2011/0204845 A1 | 8/2011 | Paparo et al. |
| 2011/0215724 A1 | 9/2011 | Chakravarty et al. |
| 2011/0215731 A1 | 9/2011 | Jeong et al. |
| 2011/0221346 A1 | 9/2011 | Lee et al. |
| 2011/0222195 A1 | 9/2011 | Benoit et al. |
| 2011/0248812 A1 | 10/2011 | Hu et al. |
| 2011/0251751 A1 | 10/2011 | Knight |
| 2011/0282468 A1 | 11/2011 | Ashdown |
| 2011/0310605 A1 | 12/2011 | Renn et al. |
| 2012/0001566 A1 | 1/2012 | Josefowicz et al. |
| 2012/0019971 A1 | 1/2012 | Flaherty et al. |
| 2012/0038490 A1 | 2/2012 | Verfuerth |
| 2012/0098439 A1 | 4/2012 | Recker et al. |
| 2012/0119669 A1 | 5/2012 | Melanson et al. |
| 2012/0119682 A1 | 5/2012 | Warton |
| 2012/0143383 A1 | 6/2012 | Cooperrider et al. |
| 2012/0153854 A1 | 6/2012 | Setomoto et al. |
| 2012/0169053 A1 | 7/2012 | Tchoryk, Jr. et al. |
| 2012/0169239 A1 | 7/2012 | Chen et al. |
| 2012/0181935 A1 | 7/2012 | Velazquez |
| 2012/0194054 A1 | 8/2012 | Johnston et al. |
| 2012/0209755 A1 | 8/2012 | Verfuerth et al. |
| 2012/0221154 A1 | 8/2012 | Runge |
| 2012/0224363 A1 | 9/2012 | Van De Ven |
| 2012/0230584 A1 | 9/2012 | Kubo et al. |
| 2012/0242254 A1 | 9/2012 | Kim et al. |
| 2013/0033183 A1 | 2/2013 | Verfuerth et al. |
| 2013/0126715 A1 | 5/2013 | Flaherty |
| 2013/0131882 A1 | 5/2013 | Verfuerth et al. |
| 2013/0141000 A1 | 6/2013 | Wei et al. |
| 2013/0154488 A1 | 6/2013 | Sadwick et al. |
| 2013/0163243 A1 | 6/2013 | Reed |
| 2013/0193857 A1 | 8/2013 | Tlachac et al. |
| 2013/0229518 A1 | 9/2013 | Reed et al. |
| 2013/0235202 A1 | 9/2013 | Nagaoka et al. |
| 2013/0249429 A1 | 9/2013 | Woytowitz et al. |
| 2013/0249479 A1 | 9/2013 | Partovi |
| 2013/0340353 A1 | 12/2013 | Whiting et al. |
| 2014/0001961 A1 | 1/2014 | Anderson et al. |
| 2014/0028198 A1 | 1/2014 | Reed et al. |
| 2014/0055990 A1 | 2/2014 | Reed |
| 2014/0070964 A1 | 3/2014 | Rupprath et al. |
| 2014/0078308 A1 | 3/2014 | Verfuerth |
| 2014/0097759 A1 | 4/2014 | Verfuerth et al. |
| 2014/0159585 A1 | 6/2014 | Reed |
| 2014/0166447 A1 | 6/2014 | Thea et al. |
| 2014/0203714 A1 | 7/2014 | Zhang et al. |
| 2014/0244044 A1 | 8/2014 | Davis et al. |
| 2014/0265894 A1 | 9/2014 | Weaver |
| 2014/0265897 A1 | 9/2014 | Taipale et al. |
| 2014/0313719 A1 | 10/2014 | Wang et al. |
| 2015/0015716 A1 | 1/2015 | Reed et al. |
| 2015/0208479 A1 | 7/2015 | Radermacher et al. |
| 2015/0280782 A1 | 10/2015 | Arbinger et al. |
| 2015/0312983 A1 | 10/2015 | Hu et al. |
| 2016/0021713 A1 | 1/2016 | Reed |
| 2016/0150622 A1 | 5/2016 | Flinsenberg et al. |
| 2016/0234899 A1 | 8/2016 | Reed et al. |
| 2017/0055324 A1 | 2/2017 | Reed |
| 2017/0141565 A1* | 5/2017 | White .................. H02H 9/02 |
| 2017/0311424 A1 | 10/2017 | Vendetti et al. |

FOREIGN PATENT DOCUMENTS

| | | |
|---|---|---|
| EP | 1 734 795 A1 | 12/2006 |
| EP | 2 559 937 A1 | 2/2013 |
| EP | 1 459 600 B1 | 2/2014 |
| FR | 2 883 306 A1 | 9/2006 |
| JP | 6-335241 A | 12/1994 |
| JP | 2001-333420 A | 11/2001 |
| JP | 2004-279668 A | 10/2004 |
| JP | 2004-320024 A | 11/2004 |
| JP | 2004-349065 A | 12/2004 |
| JP | 2005-93171 A | 4/2005 |
| JP | 2005-198238 A | 7/2005 |
| JP | 2005-310997 A | 11/2005 |
| JP | 2006-179672 A | 7/2006 |
| JP | 2006-244711 A | 7/2006 |
| JP | 2008-59811 A | 3/2008 |
| JP | 2008-509538 A | 3/2008 |
| JP | 2008-130523 A | 6/2008 |
| JP | 2008-159483 A | 7/2008 |
| JP | 2008-177144 A | 7/2008 |
| JP | 2008-529177 A | 7/2008 |

(56) References Cited

FOREIGN PATENT DOCUMENTS

| | | |
|---|---|---|
| JP | 2008-535279 A | 8/2008 |
| JP | 2010-504628 A | 2/2010 |
| KR | 10-2005-0078403 A | 8/2005 |
| KR | 10-2006-0071869 A | 6/2006 |
| KR | 10-2006-0086254 A | 7/2006 |
| KR | 10-2008-0100140 A | 11/2008 |
| KR | 10-2009-0042400 A | 4/2009 |
| KR | 10-0935736 B1 | 1/2010 |
| KR | 20-2010-0007230 U | 7/2010 |
| KR | 10-1001276 B1 | 12/2010 |
| KR | 10-1044224 B1 | 6/2011 |
| KR | 10-1150876 B1 | 5/2012 |
| WO | 02/076068 A1 | 9/2002 |
| WO | 03/056882 A1 | 7/2003 |
| WO | 2005/003625 A1 | 1/2005 |
| WO | 2006/057866 A2 | 6/2006 |
| WO | 2007/023454 A1 | 3/2007 |
| WO | 2007/036873 A2 | 4/2007 |
| WO | 2008/030450 A2 | 3/2008 |
| WO | 2008/034242 A1 | 3/2008 |
| WO | 2009/040703 A2 | 4/2009 |
| WO | 2010/086757 A1 | 8/2010 |
| WO | 2010/133719 A1 | 11/2010 |
| WO | 2011/063302 A2 | 5/2011 |
| WO | 2011/129309 A1 | 10/2011 |
| WO | 2012/006710 A1 | 1/2012 |
| WO | 2012/142115 A2 | 10/2012 |
| WO | 2013/074900 A1 | 5/2013 |
| WO | 2014/018773 A1 | 1/2014 |
| WO | 2014/039683 A1 | 3/2014 |
| WO | 2014/078854 A1 | 5/2014 |

OTHER PUBLICATIONS

Amendment, filed Jun. 23, 2017, for U.S. Appl. No. 15/206,019, Reed, "High Efficiency Power Controller for Luminaire," 9 pages.
Corrected Notice of Allowance, dated Aug. 12, 2015, and Notice of Allowance, dated Jul. 31, 2015 for Reed et al., "Remotely Adjustable Solid-State Lamp," U.S. Appl. No. 13/875,130, 11 pages.
EE Herald, "Devices to protect High brightness LED from ESD," dated Mar. 16, 2009, retrieved Jun. 10, 2011, from http://www.eeherald.com/section/new-products/np100779.html, 1 page.
European Office Action, dated Aug. 11, 2017, for European Application No. 13 823 055.2-1802, 4 pages.
Extended European Search Report dated Jan. 4, 2016, for corresponding EP Application No. 13823055.2-1802, 7 pages.
Extended European Search Report dated Oct. 21, 2015, for corresponding EP Application No. 13835001.2-1802, 7 pages.
Extended European Search Report, dated Apr. 11, 2016, for corresponding European Application No. 16152644.7, 8 pages.
Extended European Search Report, dated Aug. 13, 2014, for corresponding European Application No. 09826926.9, 8 pages.
Extended European Search Report, dated May 3, 2016, for corresponding European Application No. 12771286.7, 9 pages.
Extended European Search Report, dated Oct. 15, 2015, for corresponding European Application No. 12825132.9-1802, 5 pages.
Extended European Search Report, dated Sep. 28, 2015, for corresponding European Application No. 12850159.0-1802, 6 pages.
Fairchild Semiconductor, "LED Application Design Guide Using Half-Bridge LLC Resonant Converter for 100W Street Lighting," AN-9729, Fairchild Semiconductor Corporation, Rev. 1.0.0, Mar. 22, 2011, 17 pages.
Huang, "Designing an LLC Resonant Half-Bridge Power Converter," 2010 Texas Instruments Power Supply Design Seminar, SEM1900, Topic 3, TI Literature No. SLUP263, Copyright 2010, 2011, Texas Instruments Incorporated, 28 pages.
International Search Report and Written Opinion, dated May 7, 2015, for International Application No. PCT/US2015/013512, 15 pages.
International Search Report dated Nov. 11, 2014, for International Application No. PCT/US2014/047867, 3 pages.

International Search Report, dated Dec. 13, 2010 for PCT/US2010/035649, 3 pages.
International Search Report, dated Dec. 15, 2010 for PCT/US2010/035658, 3 pages.
International Search Report, dated Dec. 28, 2010 for PCT/US2010/035651, 3 pages.
International Search Report, dated Dec. 30, 2013 for PCT/US2013/058266, 3 pages.
International Search Report, dated Feb. 27, 2013, for PCT/US2012/065476, 3 pages.
International Search Report, dated Jan. 14, 2013, for PCT/US2012/052009, 3 pages.
International Search Report, dated Jul. 9, 2009 for PCT/US2009/043171, 5 pages.
International Search Report, dated Jun. 21, 2010, for PCT/US2009/064625, 3 pages.
International Search Report, dated Nov. 19, 2013 for PCT/US2013/052092, 4 pages.
International Search Report, dated Oct. 8, 2012 for PCT/US2012/033059, 3 pages.
Japanese Office Action, dated Jan. 6, 2015, for corresponding Japanese Application No. 2011-536564, 6 pages.
Kadirvel et al., "Self-Powered, Ambient Light Sensor Using bq25504," Texas Instruments, Application Report, SLUA629—Jan. 2012, 6 pages.
Korean Office Action with English Translation, dated May 16, 2016, for corresponding KR Application No. 10-2011-7014088, 22 pages.
Korean Office Action with English Translation, dated Nov. 18, 2015, for corresponding KR Application No. 10-2011-7014088, 14 pages.
Littelfuse, "Application Note: Protecting LEDs in Product Designs," 2009, 2 pages.
Notice of Allowance dated Apr. 11, 2014, for Reed, "Apparatus and Method of Energy Efficient Illumination," U.S. Appl. No. 13/943,537, 9 pages.
Notice of Allowance dated Apr. 11, 2016, for Reed, "High Efficiency Power Controller for Luminaire," U.S. Appl. No. 14/546,354, 5 pages.
Notice of Allowance dated Apr. 12, 2013, for Reed, "Apparatus and Method of Energy Efficient Illumination," U.S. Appl. No. 12/784,093, 9 pages.
Notice of Allowance dated Apr. 23, 2015, for Reed, "Electronic Control to Regulate Power for Solid-State Lighting and Methods Thereof," U.S. Appl. No. 12/619,535, 8 pages.
Notice of Allowance dated Apr. 27, 2015, for Reed et al., "Apparatus and Method of Operating a Luminaire," U.S. Appl. No. 13/558,191, 8 pages.
Notice of Allowance dated Aug. 29, 2014, for Reed et al., "Adjustable Output Solid-State Lamp With Security Features," U.S. Appl. No. 13/679,687, 9 pages.
Notice of Allowance dated Aug. 4, 2015, for Reed, "Solid State Lighting, Drive Circuit and Method of Driving Same," U.S. Appl. No. 13/875,000, 9 pages.
Notice of Allowance dated Feb. 25, 2016, for Reed, "Adjustable Output Solid-State Lighting Device," U.S. Appl. No. 13/707,123, 9 pages.
Notice of Allowance dated Jul. 1, 2014, for Reed, "Luminaire With Atmospheric Electrical Activity Detection and Visual Alert Capabilities," U.S. Appl. No. 13/786,114, 9 pages.
Notice of Allowance dated Jul. 18, 2016, for Reed et al., "Systems and Methods That Employ Object Recognition," U.S. Appl. No. 13/411,321, 15 pages.
Notice of Allowance dated Jul. 30, 2014, for Reed, "Apparatus and Method of Energy Efficient Illumination Using Received Signals," U.S. Appl. No. 13/085,301, 5 pages.
Notice of Allowance dated Jul. 7, 2014, for Reed et al., "Apparatus and Method for Schedule Based Operation of a Luminaire," U.S. Appl. No. 13/604,327, 8 pages.
Notice of Allowance dated Jun. 19, 2015, for Reed et al., "Apparatus and Method for Schedule Based Operation of a Luminaire" U.S. Appl. No. 14/552,274, 9 pages.
Notice of Allowance dated Jun. 20, 2014, for Reed et al., "Long-Range Motion Detection for Illumination Control," U.S. Appl. No. 12/784,080, 7 pages.

(56) References Cited

OTHER PUBLICATIONS

Notice of Allowance dated Mar. 16, 2017, for U.S. Appl. No. 14/552,274, Reed et al., "Apparatus and Method for Schedule Based Operation of a Luminaire," 9 pages.
Notice of Allowance dated Mar. 24, 2017, for Reed, "Apparatus and Method of Energy Efficient Illumination Using Received Signals," U.S. Appl. No. 14/557,275, 23 pages.
Notice of Allowance dated May 23, 2013, for Reed, "Apparatus and Method of Energy Efficient Illumination," U.S. Appl. No. 12/784,091, 6 pages.
Notice of Allowance dated Nov. 18, 2015, for Reed, "Luminaire With Switch-Mode Converter Power Monitoring," U.S. Appl. No. 14/074,166, 9 pages.
Notice of Allowance dated Nov. 5, 2014, for Reed, "Apparatus and Method of Energy Efficient Illumination," U.S. Appl. No. 14/329,508, 10 pages.
Notice of Allowance dated Nov. 6, 2015, for Reed, "Systems, Methods, and Apparatuses for Using a High Current Switching Device as a Logic Level Sensor," U.S. Appl. No. 14/179,737, 28 pages.
Notice of Allowance dated Sep. 12, 2013, for Reed, "Electrostatic Discharge Protection for Luminaire," U.S. Appl. No. 13/212,074, 6 pages.
Notice of Allowance dated Sep. 30, 2013, for Reed, "Resonant Network for Reduction of Flicker Perception in Solid State Lighting Systems," U.S. Appl. No. 13/592,590, 9 pages.
Notice of Allowance, dated Oct. 14, 2011, for Reed et al., "Low-Profile Pathway Illumination System," U.S. Appl. No. 12/437,472, 9 pages.
Notice of Allowance, dated Jul. 24, 2017, for U.S. Appl. No. 15/206,019, Reed, "High Efficiency Power Controller for Luminaire," 9 pages.
Notice of Allowance, dated Jun. 14, 2017, for U.S. Appl. No. 14/557,275, Reed, "Apparatus and Method of Energy Efficient Illumination Using Received Signals," 2 pages.
Notice of Allowance, dated Jun. 22, 2017, for U.S. Appl. No. 14/816,754, Reed et al., "Apparatus and Method of Operating a Luminaire," 11 pages.
Notice of Allowance, dated Nov. 6, 2017, for U.S. Appl. No. 15/496,985, Vendetti et al., "Luminaire Dimming Modules Uses 3 Contact NEMA Photocontrol Socket," 8 pages.
Office Action dated Apr. 15, 2016, for Reed, "Solid State Hospitality Lamp," U.S. Appl. No. 13/973,696, 11 pages.
Office Action dated Apr. 21, 2015, for Reed et al., "Remotely Adjustable Solid-State Lamp," U.S. Appl. No. 13/875,130, 10 pages.
Office Action dated Apr. 23, 2014, for Reed, "Apparatus and Method of Energy Efficient Illumination Using Received Signals," U.S. Appl. No. 13/085,301, 12 pages.
Office Action dated Apr. 24, 2013, for Reed, "Apparatus and Method of Energy Efficient Illumination," U.S. Appl. No. 12/784,091, 12 pages.
Office Action dated Aug. 14, 2014, for Reed, "Electronic Control to Regulate Power for Solid-State Lighting and Methods Thereof," U.S. Appl. No. 12/619,535, 16 pages.
Office Action dated Aug. 23, 2016, for Reed, "Apparatus and Method of Energy Efficient Illumination Using Received Signals," U.S. Appl. No. 14/557,275, 23 pages.
Office Action dated Aug. 25, 2014, for Reed et al., "Systems and Methods That Employ Object Recognition," U.S. Appl. No. 13/411,321, 35 pages.
Office Action dated Aug. 28, 2014, for Reed, "Apparatus and Method of Energy Efficient Illumination," U.S. Appl. No. 14/329,508, 8 pages.
Office Action dated Dec. 21, 2012, for Reed et al., "Long-Range Motion Detection for Illumination Control," U.S. Appl. No. 12/784,080, 26 pages.
Office Action dated Dec. 22, 2014, for Reed et al., "Apparatus and Method of Operating a Luminaire," U.S. Appl. No. 13/558,191, 17 pages.
Office Action dated Dec. 5, 2012, for Reed, "Apparatus and Method of Energy Efficient Illumination," U.S. Appl. No. 12/784,091, 18 pages.
Office Action dated Dec. 5, 2012, for Reed, "Apparatus and Method of Energy Efficient Illumination," U.S. Appl. No. 12/784,093, 13 pages.
Office Action dated Dec. 7, 2015, for Reed et al., "Systems and Methods That Employ Object Recognition," U.S. Appl. No. 13/411,321, 47 pages.
Office Action dated Feb. 17, 2017, for U.S. Appl. No. 14/939,856, Reed et al., "Luminaire With Adjustable Illumination Pattern," 13 pages.
Office Action dated Feb. 27, 2014, for Reed et al., "Adjustable Output Solid-State Lamp With Security Features," U.S. Appl. No. 13/679,687, 11 pages.
Office Action dated Feb. 25, 2013, for Reed, "Electronic Control to Regulate Power for Solid-State Lighting and Methods Thereof," U.S. Appl. No. 12/619,535, 17 pages.
Office Action dated Feb. 9, 2015, for Reed et al., "Systems and Methods That Employ Object Recognition," U.S. Appl. No. 13/411,321, 40 pages.
Office Action dated Jan. 18, 2017 for Reed, "Electronic Control to Regulate Power for Solid-State Lighting and Methods Thereof," U.S. Appl. No. 14/806,500, 18 pages.
Office Action dated Jan. 2, 2015, for Reed, "Adjustable Output Solid-State Lighting Device," U.S. Appl. No. 13/707,123, 24 pages.
Office Action dated Jan. 30, 2014, for Reed et al., "Long-Range Motion Detection for Illumination Control," U.S. Appl. No. 12/784,080, 26 pages.
Office Action dated Jul. 22, 2013, for Reed et al., "Long-Range Motion Detection for Illumination Control," U.S. Appl. No. 12/784,080, 29 pages.
Office Action dated Jul. 30, 2013, for Reed, "Electronic Control to Regulate Power for Solid-State Lighting and Methods Thereof," U.S. Appl. No. 12/619,535, 15 pages.
Office Action dated Mar. 15, 2013 for Reed et al., "Electrostatic Discharge Protection for Luminaire," U.S. Appl. No. 13/212,074, 11 pages.
Office Action dated Mar. 2, 2015, for Reed et al., "Apparatus and Method for Schedule Based Operations of a Luminaire," U.S. Appl. No. 14/552,274, 7 pages.
Office Action dated Mar. 23, 2017, for U.S. Appl. No. 15/206,019, Reed, "High Efficiency Power Controller for Luminaire," 22 pages.
Office Action dated Mar. 26, 2014, for Reed et al., "Apparatus and Method for Schedule Based Operation of a Luminaire," U.S. Appl. No. 13/604,327, 10 pages.
Office Action dated Mar. 26, 2014, for Reed, "Electronic Control to Regulate Power for Solid-State Lighting and Methods Thereof," U.S. Appl. No. 12/619,535, 16 pages.
Office Action dated Mar. 4, 2016, for Reed et al., "Long-Range Motion Detection for Illumination Control," U.S. Appl. No. 14/500,512, 18 pages.
Office Action dated May 9, 2016 for Reed, "Electronic Control to Regulate Power for Solid-State Lighting and Methods Thereof," U.S. Appl. No. 14/806,500, 18 pages.
Office Action dated Nov. 27, 2013, for Reed, "Apparatus and Method of Energy Efficient Illumination," U.S. Appl. No. 13/943,537, 8 pages.
Office Action dated Oct. 1, 2013, for Reed, "Apparatus and Method of Energy Efficient Illumination Using Received Signals," U.S. Appl. No. 13/085,301, 11 pages.
Office Action dated Oct. 5, 2015, for Reed, "Adjustable Output Solid-State Lighting Device," U.S. Appl. No. 13/707,123, 26 pages.
Office Action dated Sep. 10, 2015, for Reed, "High Efficiency Power Controller for Luminaire," U.S. Appl. No. 14/546,354, 32 pages.
Office Action dated Sep. 17, 2015, for Reed et al., "Long-Range Motion Detection for Illumination Control," U.S. Appl. No. 14/500,512, 35 pages.
Office Action dated Sep. 19, 2016, for U.S. Appl. No. 14/552,274, Reed et al., "Apparatus and Method for Schedule Based Operation of a Luminaire," 9 pages.

(56) References Cited

OTHER PUBLICATIONS

Office Action dated Sep. 6, 2016 for Reed, "Electronic Control to Regulate Power for Solid-State Lighting and Methods Thereof," U.S. Appl. No. 14/806,500, 18 pages.
Office Action, dated May 5, 2011, for Reed et al., "Low-Profile Pathway Illumination System," U.S. Appl. No. 12/437,472, 24 pages.
Panasonic Electronic Components, "LED Lighting Solutions," 2009, 6 pages.
Poplawski, "Exploring Flicker & LEDs," 2010 DOE SSL Market Introduction Workshop, U.S. Department of Energy, Jul. 22, 2010, 16 pages.
Reed et al., "Adjustable Output Solid-State Lamp With Security Features," Amendment filed Jun. 24, 2014, for U.S. Appl. No. 13/679,687, 11 pages.
Reed et al., "Adjustable Output Solid-State Lamp With Security Features," U.S. Appl. No. 61/561,616, filed Nov. 18, 2011, 33 pages.
Reed et al., "Apparatus and Method for Schedule Based Operation of a Luminaire" Amendment filed Dec. 7, 2016, for U.S. Appl. No. 14/552,274, 11 pages.
Reed et al., "Apparatus and Method for Schedule Based Operation of a Luminaire" Amendment filed Jun. 1, 2015, for U.S. Appl. No. 14/552,274, 14 pages.
Reed et al., "Apparatus and Method for Schedule Based Operation of a Luminaire," Amendment filed Jun. 7, 2016, for U.S. Appl. No. 14/552,274, 14 pages.
Reed et al., "Apparatus and Method for Schedule Based Operation of a Luminaire," Amendment filed Jun. 24, 2014, for U.S. Appl. No. 13/604,327, 14 pages.
Reed et al., "Apparatus and Method of Operating a Luminaire," Amendment filed Mar. 19, 2015, for U.S. Appl. No. 13/558,191, 20 pages.
Reed et al., "Long-Range Motion Detection for Illumination Control," Amendment filed Dec. 10, 2015, for U.S. Appl. No. 14/500,512, 20 pages.
Reed et al., "Long-Range Motion Detection for Illumination Control," Amendment filed Apr. 22, 2013, for U.S. Appl. No. 12/784,080, 17 pages.
Reed et al., "Long-Range Motion Detection for Illumination Control," Amendment filed Apr. 28, 2014, for U.S. Appl. No. 12/784,080, 20 pages.
Reed et al., "Long-Range Motion Detection for Illumination Control," Amendment filed Sep. 27, 2013, for U.S. Appl. No. 12/784,080, 20 pages.
Reed et al., "Long-Range Motion Detection for Illumination Control," U.S. Appl. No. 61/180,017, filed May 20, 2009, 32 pages.
Reed et al., "Low-Profile Pathway Illumination System," Amendment filed Jul. 29, 2011, for U.S. Appl. No. 12/437,472, 19 pages.
Reed et al., "Low-Profile Pathway Illumination System," U.S. Appl. No. 61/051,619, filed May 8, 2008, 25 pages.
Reed et al., "Remotely Adjustable Solid-State Lamp," Amendment filed Apr. 1, 2015, for U.S. Appl. No. 13/875,130, 14 pages.
Reed et al., "Remotely Adjustable Solid-State Lamp," Amendment filed Jul. 20, 2015, for U.S. Appl. No. 13/875,130, 15 pages.
Reed et al., "Remotely Adjustable Solid-State Lamp," U.S. Appl. No. 61/641,781, filed May 2, 2012, 65 pages.
Reed et al., "Systems and Methods That Employ Object Recognition," Amendment filed Jul. 7, 2015, for U.S. Appl. No. 13/411,321, 21 pages.
Reed et al., "Systems and Methods That Employ Object Recognition," Amendment filed Mar. 7, 2016, for U.S. Appl. No. 13/411,321, 16 pages.
Reed et al., "Systems and Methods That Employ Object Recognition," Amendment filed May 6, 2015, for U.S. Appl. No. 13/411,321, 20 pages.
Reed et al., "Systems and Methods That Employ Object Recognition," Amendment filed Nov. 21, 2014, for U.S. Appl. No. 13/411,321, 20 pages.
Reed, "Adjustable Output Solid-State Lighting Device," Amendment filed Jan. 8, 2016, for U.S. Appl. No. 13/707,123, 11 pages.
Reed, "Adjustable Output Solid-State Lighting Device," Amendment filed Apr. 2, 2015, for U.S. Appl. No. 13/707,123, 14 pages.
Reed, "Adjustable Output Solid-State Lighting Device," U.S. Appl. No. 61/567,308, filed Dec. 6, 2011, 49 pages.
Reed, "Ambient Light Control in Solid State Lamps and Luminaires," Amendment filed Jan. 29, 2015, for U.S. Appl. No. 14/609,168, 12 pages.
Reed, "Ambient Light Control in Solid State Lamps and Luminaires," U.S. Appl. No. 61/933,733, filed Jan. 30, 2014, 8 pages.
Reed, "Apparatus and Method of Energy Efficient Illumination Using Received Signals," Amendment filed Jan. 2, 2014, for U.S. Appl. No. 13/085,301, 26 pages.
Reed, "Apparatus and Method of Energy Efficient Illumination Using Received Signals," Amendment filed Jul. 23, 2014, for U.S. Appl. No. 13/085,301, 12 pages.
Reed, "Apparatus and Method of Energy Efficient Illumination," Amendment filed Apr. 2, 2013, for U.S. Appl. No. 12/784,093, 13 pages.
Reed, "Apparatus and Method of Energy Efficient Illumination," Amendment filed Apr. 4, 2013, for U.S. Appl. No. 12/784,091, 15 pages.
Reed, "Apparatus and Method of Energy Efficient Illumination," Amendment filed May 14, 2013, for U.S. Appl. No. 12/784,091, 9 pages.
Reed, "Apparatus and Method of Energy Efficient Illumination," Amendment filed Sep. 30, 2014, for U.S. Appl. No. 14/329,508, 18 pages.
Reed, "Apparatus and Method of Energy Efficient Illumination," U.S. Appl. No. 61/346,263, filed May 19, 2010, 67 pages.
Reed, "Apparatus and Method of Energy Efficient Illumination," U.S. Appl. No. 61/333,983, filed May 12, 2010, 57 pages.
Reed, "Electronic Control to Regulate Power for Solid-State Lighting and Methods Thereof," Amendment filed Dec. 15, 2014, for U.S. Appl. No. 12/619,535, 21 pages.
Reed, "Electronic Control to Regulate Power for Solid-State Lighting and Methods Thereof," Amendment filed May 23, 2017 for U.S. Appl. No. 14/806,500, 11 pages.
Reed, "Electronic Control to Regulate Power for Solid-State Lighting and Methods Thereof," Amendment filed May 24, 2013, for U.S. Appl. No. 12/619,535, 21 pages.
Reed, "Electronic Control to Regulate Power for Solid-State Lighting and Methods Thereof," Amendment filed May 27, 2014, for U.S. Appl. No. 12/619,535, 22 pages.
Reed, "Electronic Control to Regulate Power for Solid-State Lighting and Methods Thereof," Amendment filed Oct. 30, 2013, for U.S. Appl. No. 12/619,535, 5 pages.
Reed, "Electronic Control to Regulate Power for Solid-State Lighting and Methods Thereof," Response Under 37 CFR 1.116 filed Dec. 5, 2016 for U.S. Appl. No. 14/806,500, 12 pages.
Reed, "Electronic Control to Regulate Power for Solid-State Lighting and Methods Thereof," U.S. Appl. No. 61/115,438, filed Nov. 17, 2008, 51 pages.
Reed, "Electronic Control to Regulate Power for Solid-State Lighting and Methods Thereof," U.S. Appl. No. 61/154,619, filed Feb. 23, 2009, 62 pages.
Reed, "Electrostatic Discharge Protection for Luminaire," Amendement filed Jun. 17, 2013, for U.S. Appl. No. 13/212,074, 11 pages.
Reed, "High Efficiency Power Controller for Luminaire," Amendment filed Feb. 9, 2016, for U.S. Appl. No. 14/546,354, 11 pages.
Reed, "High Efficiency Power Controller for Luminaire," U.S. Appl. No. 61/905,699, filed Nov. 18, 2013, 5 pages.
Reed, "Low Power Photocontrol for Luminaire," Amendment filed Jun. 13, 2016, for U.S. Appl. No. 14/844,944, 10 pages.
Reed, "Low Power Photocontrol for Luminaire," Notice of Allowance dated Aug. 24, 2016, for U.S. Appl. No. 14/844,944, 7 pages.
Reed, "Low Power Photocontrol for Luminaire," Office Action dated Apr. 27, 2016, for U.S. Appl. No. 14/844,944, 10 pages.
Reed, "Low Power Photocontrol for Luminaire," U.S. Appl. No. 62/137,666, filed Mar. 24, 2015, 36 pages.
Reed, "Luminaire With Atmospheric Electrical Activity Detection and Visual Alert Capabilities," U.S. Appl. No. 61/649,159, filed Aug. 28, 2012, 52 pages.

(56) References Cited

OTHER PUBLICATIONS

Reed, "Luminaire With Switch-Mode Converter Power Monitoring," U.S. Appl. No. 61/723,675, filed Nov. 7, 2012, 73 pages.
Reed, "Output Ripple Reduction for Power Converters," U.S. Appl. No. 15/709,022, filed Sep. 19, 2017, 27 pages.
Reed, "Photocontrol for Luminaire Consumes Very Low Power," U.S. Appl. No. 61/849,841, filed Jul. 24, 2013, 41 pages.
Reed, "Resonant Network for Reduction of Flicker Perception in Solid State Lighting Systems," U.S. Appl. No. 61/527,029, filed Aug. 24, 2011, 41 pages.
Reed, "Solid State Hospitality Lamp," U.S. Appl. No. 61/692,619, filed Aug. 23, 2012, 32 pages.
Reed, "Solid State Lighting, Drive Circuit and Method of Driving Same," U.S. Appl. No. 61/640,963, filed May 1, 2012, 24 pages.
Reed, "Systems, Methods, and Apparatuses for Using a High Current Switching Device as a Logic Level Sensor," U.S. Appl. No. 61/764,395, filed Feb. 13, 2013, 48 pages.
Reed, "High Reliability Photocontrol Controls With 0 to 10 Volt Dimming Signal Line and Method," U.S. Appl. No. 62/507,730, filed May 17, 2017, 17 pages.
Reed, "Luminaire With Adjustable Illumination Pattern," U.S. Appl. No. 62/114,826, filed Feb. 11, 2015, 68 pages.
Renesas Electronics, "Zener Diodes for Surge Absorption—Applications of high-intensity LED," Apr. 2010, 1 page.
Tyco Electronics, "Circuit Protection," retrieved Jun. 10, 2011, retrieved from http://www.tycoelectronics.com/en/products/circuit-protection.html, 2 pages.
Written Opinion dated Nov. 11, 2014, for International Application No. PCT/US2014/047867, 5 pages.
Written Opinion, dated Dec. 13, 2010 for PCT/US2010/035649, 4 pages.
Written Opinion, dated Dec. 15, 2010 for PCT/US2010/035658, 3 pages.
Written Opinion, dated Dec. 28, 2010 for PCT/US2010/035651, 3 pages.
Written Opinion, dated Dec. 30, 2013 for PCT/US2013/058266, 8 pages.
Written Opinion, dated Feb. 27, 2013, for PCT/US2012/065476, 8 pages.
Written Opinion, dated Jan. 14, 2013, for PCT/US2012/052009, 5 pages.
Written Opinion, dated Jul. 9, 2009 for PCT/US2009/043171, 8 pages.
Written Opinion, dated Jun. 21, 2010 for PCT/US2009/064625, 5 pages.
Written Opinion, dated Nov. 19, 2013 for PCT/US2013/052092, 7 pages.
Written Opinion, dated Oct. 8, 2012 for PCT/US2012/033059, 3 pages.
Written Opinion, dated Sep. 30, 2011, for PCT/US2011/021359, 4 pages.
Notice of Allowance, dated Jan. 2, 2018, for U.S. Appl. No. 14/806,500, Reed, "Electronic Control to Regulate Power for Solid-State Lighting and Methods Thereof," 9 pages.

* cited by examiner

INRUSH CURRENT LIMITER CIRCUIT

BACKGROUND

Technical Field

The present disclosure generally relates to protection of components from damage caused by excessive electrical current.

Description of the Related Art

A photocontrol is a device that switches or controls electrical loads based on ambient light levels. As an example, a photocontrol can be used as a switch that provides electrical power to a luminaire only when detected light levels are below a desired level. Photocontrols used for such luminaires may include photosensors that are electrically and operably coupled to switching devices rated for use at relatively high line voltages (e.g., 90 VAC to 600 VAC) and at relatively high currents (e.g., amperes and higher). For example, a photocontrol for a luminaire may include a photosensor that controls an electro-mechanical relay coupled between a source of electrical power and a control device (e.g., a magnetic or electronic transformer) within the luminaire. The electro-mechanical relay may be configured to be in an electrically continuous state unless a signal from the photosensor is present to supply power to the luminaire. If the photosensor is illuminated with a sufficient amount of light, the photosensor outputs the signal that causes the electro-mechanical relay to switch to an electrically discontinuous state such that no power is supplied to the luminaire.

Conventional photocontrols used with luminaires suffer from a number of drawbacks. For example, a typical electro-mechanical relay used with a photocontrol for a luminaire may have a relatively short life span. For example, electro-mechanical relays of conventional photocontrols used with luminaires may be rated to have only 5000 contactor closures with standard loads. Arching caused by high capacitive in-rush currents of electronically ballasted luminaires and inductive "kick back" of magnetically ballasted luminaires can corrode the contactors of the electro-mechanical relays. Additionally, the contactors may include silver or other metal alloys upon which oxides and sulfides may form during normal operation. At line voltage and current, such oxides and sulfides may present a resistance to the passage of current through the contactors.

In response to the increasing emphasis placed on energy efficiency, many luminaires are being retrofitted with more energy efficient light sources. For example, conventional light sources (e.g., incandescent lights) are being replaced with solid-state light sources (e.g., LED arrays). Circuitry that regulates electrical power supplied to such solid-state light source (e.g., LED drivers) may draw relatively high inrush currents when the light sources are switched on. The inrush currents of electrically ballasted light sources may cause more damage to the contactors of electro-mechanical relays than is caused by the kickback currents of magnetically ballasted light sources. Accordingly, when conventional photocontrols having electro-mechanical relays are used with luminaires having solid-state light sources, the electro-mechanical relays may fail or cease to function reliably well before their rated number of contactor closures.

Generally, inrush current, also referred to as input surge current or switch-on current, is the maximum, instantaneous input current drawn by an electrical device when first turned on. Power converters, such as LED driver circuits, often have inrush currents much higher than their steady state currents due to the charging current of the input capacitance (e.g., reservoir or input capacitor of an LED driver circuit). The selection of overcurrent protection devices such as fuses and circuit breakers is made more complicated when high inrush currents must be tolerated because the overcurrent protection must react quickly to overload or short circuit faults but must not interrupt the circuit when the inrush current flows. For example, an LED luminaire with a 0.5 ampere (A) continuous input current rating may have an inrush current of 60 A, which is more than 100 times the continuous input current rating.

An inrush current limiter is a component or circuit used to limit inrush current to avoid gradual damage to components and to avoid blowing fuses or tripping circuit breakers. Negative temperature coefficient (NTC) thermistors and fixed resistors are two components which are often used to limit inrush current.

NTC thermistors can be used as inrush-current limiting devices in power supply circuits when added in series with the circuit being protected. NTC thermistors present a higher resistance initially, which prevents large currents from flowing at turn-on. As current continues to flow, NTC thermistors heat up and their resistance drops, allowing higher current flow during normal operation. Because NTC thermistors are added in series with the circuit being protected, NTC thermistors cause considerable power waste. Further, since NTC thermistors require a cool down period before they become useful again, NTC thermistors provide little or no protection when short term power loss occurs.

Fixed resistors are also used to limit inrush current. Fixed resistors are inherently less efficient than NTC thermistors since the resistance never decreases from the value required to limit the inrush current. Consequently, fixed resistors are only used for low power circuitry where the ongoing additional power waste is minor.

BRIEF SUMMARY

An inrush current protection circuit may be summarized as including an input terminal electrically coupleable to an output terminal of a control switch, the control switch selectively couples an alternating current (AC) power source to a load; an output terminal electrically coupleable to the load; a load pre-charge circuit electrically coupled between the input terminal and the output terminal; a bidirectional AC switch including a switch input terminal, a switch output terminal, and a switch control terminal, the switch input terminal electrically coupled to the input terminal of the protection circuit and the switch output terminal electrically coupled to the output terminal of the protection circuit such that the bidirectional AC switch is electrically coupled in parallel with the load pre-charge circuit, the bidirectional AC switch having an opened state, in which the bidirectional AC switch has a high resistance which inhibits AC flow, and a closed state, in which the bidirectional AC switch has a low resistance which permits AC flow; and a switch control circuit electrically coupled to the switch control terminal of the bidirectional AC switch and electrically coupleable to the input terminal of the protection circuit to receive power from the AC power source via the control switch, in operation the switch control circuit: causes the bidirectional AC switch to be in the opened state while the control switch is open; detects AC power from the AC power source via the input terminal of the protection circuit due to a closing of the control switch; responsive to the detection of AC power, causes the bidirectional AC switch to remain in the opened state for a determined delay period which causes current to flow through the load pre-charge circuit; and causes the bidirectional AC switch to transition from the opened state to the closed state after the determined delay period which causes current to flow through the bidirectional AC switch and to bypass the load pre-charge circuit. The switch control circuit may include an RC delay circuit which may include at least one resistor and at least one capacitor. The load pre-charge circuit may include a resistor. The resistor may have a resistance value between 20Ω and 300Ω. The bidirectional AC switch may include two source-connected metal oxide semiconductor field-effect transistors (MOSFETs). The bidirectional AC switch may include an enhancement mode Metal Oxide Semiconductor Field Effect Transistor (MOSFET).

The switch control circuit may include a bridge rectifier comprising a plurality of diodes, the bridge rectifier including a positive terminal and a negative terminal; a reservoir capacitor electrically coupled between the positive terminal and the negative terminal of the bridge rectifier; and a zener diode having a cathode electrically coupled to the positive terminal of the bridge rectifier and an anode electrically coupled to the negative terminal of the bridge rectifier. The switch control circuit may include a transistor which selectively conducts current when a voltage across the reservoir capacitor reaches a determined voltage value. The transistor may be a PNP type bipolar junction transistor which has a base terminal, a collector terminal and an emitter terminal, the base terminal coupled to the positive terminal of the bridge rectifier via a first resistor, the collector terminal coupled to the positive terminal of the bridge rectifier via a second resistor, and the emitter terminal coupled to the switch control terminal of the bidirectional AC switch. The switch control circuit may include a zener diode having a cathode electrically coupled to the base terminal of the PNP type bipolar junction transistor and an anode electrically coupled to the negative terminal of the bridge rectifier. The reservoir capacitor may have a capacitance value between 0.1 microfarads (μF) and 10 μF. The negative terminal of the bridge rectifier may be electrically coupled to the AC power source via a first resistor, and the positive terminal of the bridge rectifier may be electrically coupled to the control switch via a second resistor. The control switch may include a photocontrol or a lighting control contactor. The load may include a driver circuit for a solid state lighting system.

An inrush current protection circuit may be summarized as including an input terminal electrically coupleable to an output terminal of a control switch, the control switch selectively couples an alternating current (AC) power source to a load; an output terminal electrically coupleable to the load; a load pre-charge resistor electrically coupled between the input terminal and the output terminal; a bidirectional AC switch which includes two source-connected metal oxide semiconductor field-effect transistors (MOSFETs), a drain of a first one of the two MOSFETs defining a switch input terminal, a drain of a second one of the two MOSFETs defining a switch output terminal, and gates of the two MOSFETs electrically coupled together to define a switch control terminal, the switch input terminal electrically coupled to the input terminal of the protection circuit and the switch output terminal electrically coupled to the output terminal of the protection circuit such that the bidirectional AC switch is electrically coupled in parallel with the load pre-charge resistor, the bidirectional AC switch having an opened state and a closed state; and a switch control circuit electrically coupled to the switch control terminal of the bidirectional AC switch and electrically coupleable to the input terminal of the protection circuit to receive power from the AC power source via the control switch, in operation the switch control circuit: causes the bidirectional AC switch to be in the opened state while the control switch is open; detects AC power from the AC power source via the input terminal of the protection circuit due to a closing of the control switch; responsive to the detection of AC power, causes the bidirectional AC switch to remain in the opened state for a determined delay period which causes current to flow through the load pre-charge resistor; and causes the bidirectional AC switch to transition from the opened state to the closed state after the determined delay period which causes current to flow through the bidirectional AC switch and to bypass the load pre-charge resistor. The switch control circuit may include an RC delay circuit which may include at least one resistor and at least one capacitor. The load pre-charge resistor may have a resistance value between 20Ω and 300Ω. Each of the MOSFETs may include an enhancement mode MOSFET.

The switch control circuit may include a bridge rectifier comprising a plurality of diodes, the bridge rectifier including a positive terminal and a negative terminal; a reservoir capacitor electrically coupled between the positive terminal and the negative terminal of the bridge rectifier; and a zener diode having a cathode electrically coupled to the positive terminal of the bridge rectifier and an anode electrically coupled to the negative terminal of the bridge rectifier. The switch control circuit may include a transistor which selectively conducts current when a voltage across the reservoir capacitor reaches a determined voltage value. The transistor may be a PNP type bipolar junction transistor which may have a base terminal, a collector terminal and an emitter terminal, the base terminal coupled to the positive terminal of the bridge rectifier via a first resistor, the collector terminal coupled to the positive terminal of the bridge rectifier via a second resistor, and the emitter terminal coupled to the switch control terminal of the bidirectional AC switch. The switch control circuit may include a zener diode having a cathode electrically coupled to the base terminal of the PNP type bipolar junction transistor and an anode electrically coupled to the negative terminal of the bridge rectifier. The reservoir capacitor may have a capacitance value between 0.1 microfarads (μF) and 10 μF. The negative terminal of the bridge rectifier may be electrically coupled to the AC power source via a first resistor, and the positive terminal of the bridge rectifier may be electrically coupled to the control switch via a second resistor. The control switch may include a photocontrol or a lighting control contactor. The load may include a driver circuit for a solid state lighting system.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
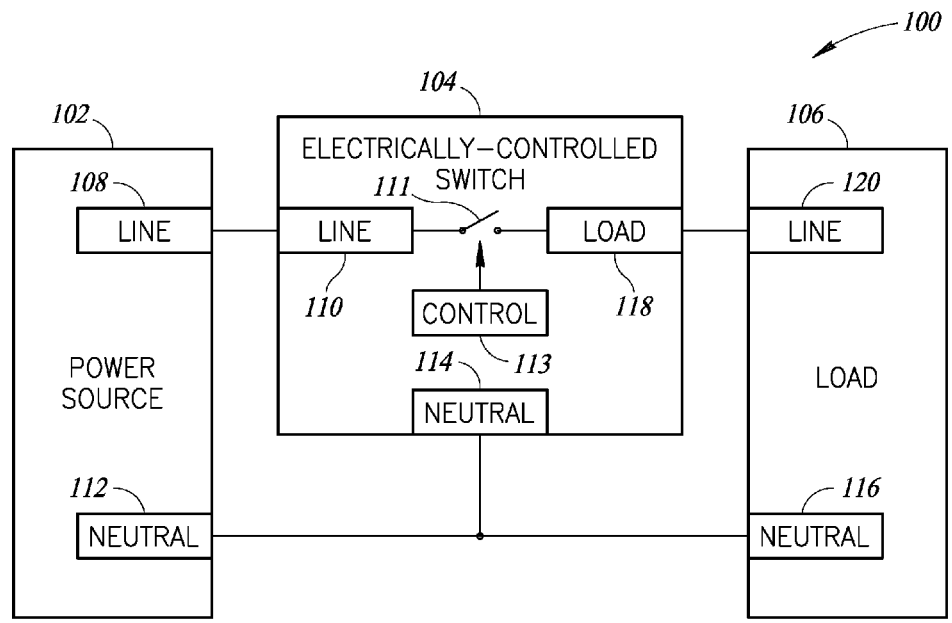
FIG. 1 is a block diagram of a control system for a luminaire that includes an electrically-controlled switch, according to one illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed to systems and methods for reducing inrush current into a component, such as a power converter (e.g., LED driver), which receives AC power from an AC power source (e.g., AC mains). In at least some implementations, the inrush current may be reduced to a level that is similar to or even less than the continuous input current rating of the component, for example. Such features may be advantageous for protecting a photocontrol of a luminaire, a contactor or other electrically-controlled switch which may be damaged due to high inrush currents caused by the input capacitance of such a component or circuit. In at least some implementations, this functionality is achieved by pre-charging the input capacitance of a component for a determined period of time after closing of the electrically-controlled switch (e.g., photocontrol, contactor) using a capacitive load pre-charge circuit, and then shorting the capacitive load pre-charge circuit using a bidirectional AC switch electrically coupled in parallel with the capacitive load pre-charge circuit after the determined period of time to selectively bypass the capacitive load pre-charge circuit. The bidirectional AC switch may have a very low "on resistance," (e.g., mΩ). Thus, during steady-state operation, the protection circuit wastes very little power compared to conventional inrush protection circuits.

FIG. 1 shows a control system 100, according to one illustrated implementation. The description of FIG. 1 provides an overview of the structure and operation of the control system 100. A power source 102 (e.g., mains power) provides AC electrical power to an electrically-controlled switch 104 (e.g., photocontrol, lighting system contactor) and load 106 (e.g., LED driver circuit which drives a plurality of LEDs), for example, using electrically conductive wires. More particularly, the power source 102 provides line voltage from a line node 108, which is electrically coupleable to a line input node 110 of the electrically-controlled switch 104. A neutral node 112 of the power source 102 is electrically coupleable to a neutral input node 114 of the electrically-controlled switch 104 and a neutral node 116 of the load 106. A load output node 118 of the electrically-controlled switch 104 is electrically coupleable to a line input node 120 of the load 106. The load output node 118 of the electrically-controlled switch 104 is selectively electrically coupled to the line input node 110 of the electrically-controlled switch by a switch 111 (e.g., relay) controlled by a control subsystem 113. In operation, the electrically-controlled switch 104 selectively provides a supply of AC power from the power source 102 to the load 106 via the load output node 118 by controlling (via the control subsystem 113) the operation of the switch 111. The load 106 may comprise any type of load, such as an LED driver circuit which drives an array of LEDs, for example.

In at least some implementations, the electrically-controlled switch 104 may be a photocontrol apparatus. In such instances, if the photocontrol apparatus is not illuminated with ambient light (e.g., during nighttime), the photocontrol apparatus provides AC power to the load 106. For example, the photocontrol apparatus may cause electrical power to be supplied from the power source 102 to an array of LEDs such that the array of LEDs produces an amount of light. If the photocontrol apparatus is illuminated with a sufficient amount of ambient light (e.g., during daytime), the photocontrol apparatus electrically disconnects the electrical power supplied from the AC power source 102 to the load 106. For example, the photocontrol apparatus stops the supply of electrical power from the power source 102 to an array of LEDs by opening the switch 111 such that the array of LEDs produces no light.

Figure 2:
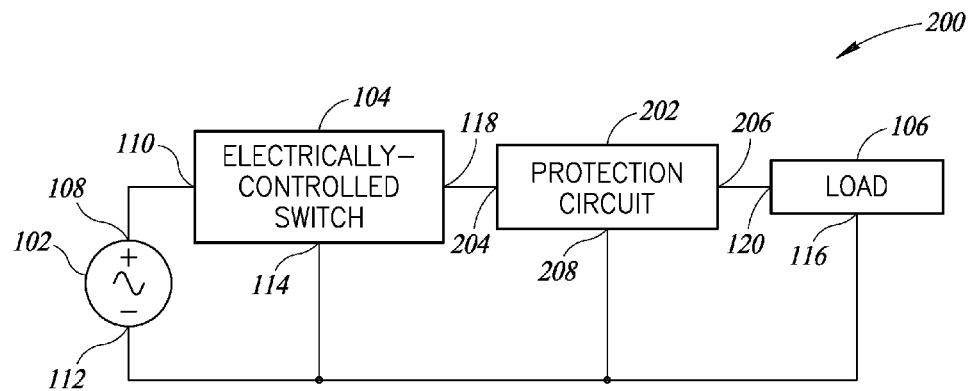
FIG. 2 is a high level block diagram of a control system which includes a protection circuit, according to one illustrated implementation.

FIG. 2 shows a high level block diagram of a control system 200 which includes a protection circuit 202. The protection circuit 202 is positioned in the control system 200 between the electrically-controlled switch 104 and the load 106. In particular, the protection circuit 202 includes an input terminal 204 electrically coupled to the load output node 118 of the electrically-controlled switch 104 and an output terminal 206 electrically coupled to the line input node 120 of the load 106. The protection circuit 202 may also include a neutral node 208 electrically coupled to the neutral node 112 of the AC power source 102.

In at least some implementations, the protection circuit 202 may be electrically coupled to receive power from the AC power source 102 via the electrically-controlled switch 104 when the electrically-controlled switch is closed (e.g., at night in the case the electrically-controlled switch 104 is a photocontrol). As discussed further below, the protection circuit 202 operates to limit inrush current (e.g., due to charging capacitance) into the load 106 upon closing of the electrically-controlled switch 104, which functionality protects the electrically-controlled switch from harm, as discussed above.

Figure 3:
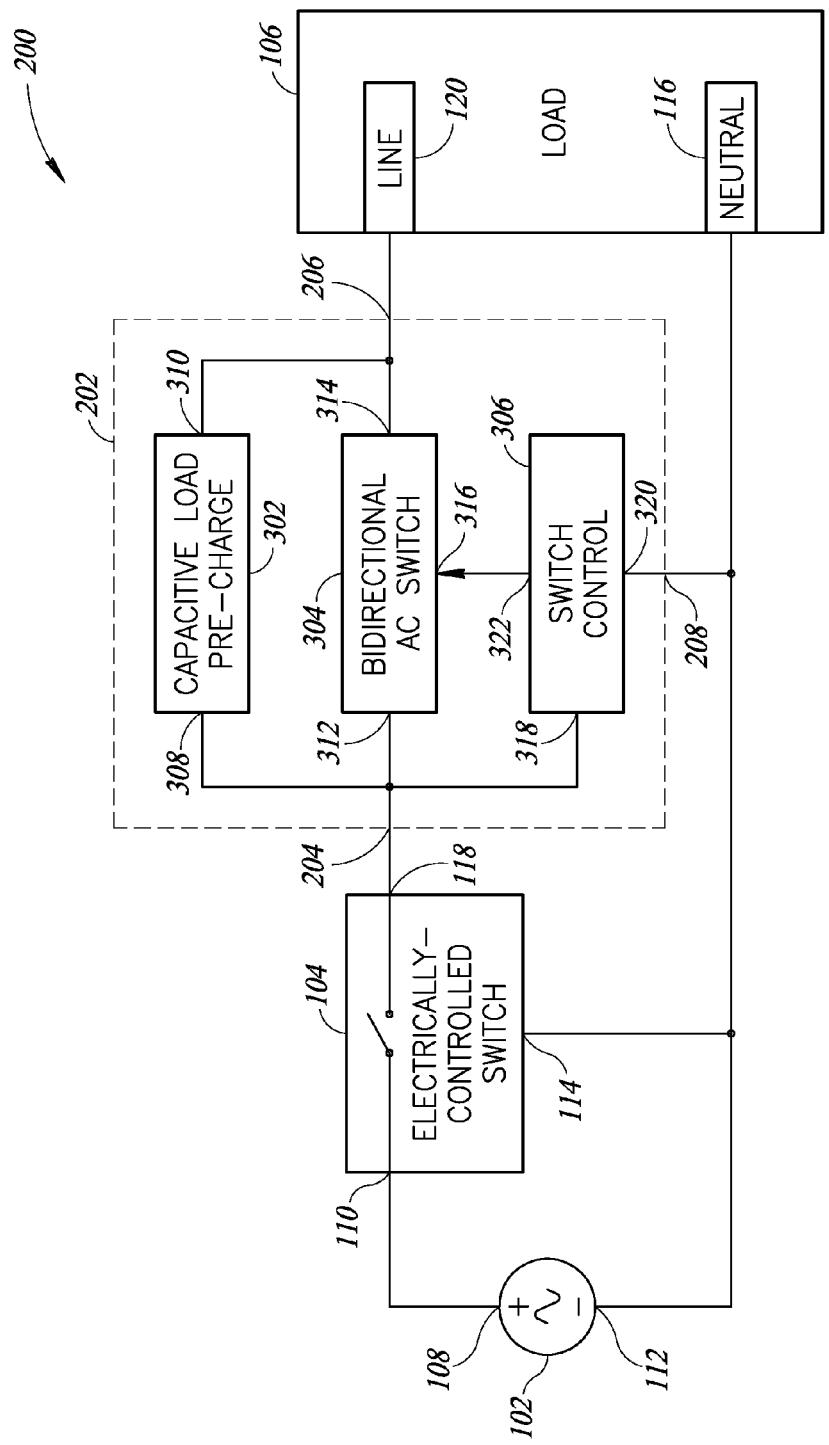
FIG. 3 is a lower-level block diagram of a protection circuit which includes a capacitive load pre-charge circuit, a bidirectional AC switch, and a switch control circuit, according to one illustrated implementation.

FIG. 3 shows a lower-level block diagram of the protection circuit 202 of FIG. 2. The protection circuit 202 includes a capacitive load pre-charge circuit 302, a bidirectional AC switch 304, and a switch control circuit 306 which controls the operation of the bidirectional AC switch. As shown, the capacitive load pre-charge circuit 302 includes an input terminal 308 and an output terminal 310. The bidirectional AC switch includes an input terminal 312, an output terminal 314, and a control terminal 316. The switch control circuit 306 includes a first input terminal 318, a second input terminal 320, and an output terminal 322.

The input terminals 308, 312 and 318 of the capacitive load pre-charge circuit 302, the bidirectional AC switch and the switch control circuit 306, respectively, are electrically coupled to the input terminal 204 of the protection circuit 202, which is electrically coupled to the load output node 118 of the electrically-controlled switch 104. The output terminals 310 and 314 of the capacitive load pre-charge circuit 302 and the bidirectional AC switch 304, respectively, are electrically coupled to the output terminal 206 of the protection circuit 202, which is electrically coupled to the line input terminal 120 of the load 106. The second input terminal 320 of the switch control circuit 306 may be electrically coupled to the neutral node 208 of the protection circuit 202, which is electrically coupled to the neutral node 112 of the AC power source 102. The output terminal 322 of the switch control circuit 306 is electrically coupled to the control terminal 316 of the bidirectional AC switch 304.

The bidirectional AC switch 304 may be controlled via the control terminal 316 to be in an opened state wherein the bidirectional AC switch has a very high resistance which does not allow current to flow therethrough. The bidirectional AC switch 304 may also be controlled via the control terminal 316 to be in a closed state wherein the switch has a low resistance (e.g., less than 2Ω, less than 1Ω) which allows AC current to flow therethrough in both directions.

As shown in FIG. 3 and noted above, the capacitive load pre-charge circuit 302 is electrically coupled in parallel with the bidirectional AC switch 304. The capacitive load pre-charge circuit 304 has a resistance which is relatively low (e.g., less than 500Ω, less than 200Ω, less than 100Ω) compared to the resistance of the bidirectional AC switch when the bidirectional AC switch is in the opened state. The resistance of the capacitive load pre-charge circuit 302 is also relatively high compared to the resistance of the bidirectional AC switch 304 when the switch is in the closed state. Thus, AC current flows from the electrically-controlled switch 104 to the load 106 through the capacitive load pre-charge circuit 302 when the bidirectional AC switch 304 is opened, and AC current flows from the electrically-controlled switch 104 to the load 106 through the bidirectional AC switch 304 when the bidirectional AC switch 304 is closed.

In operation, the bidirectional AC switch 304 may be controlled by the switch control circuit 306 to initially be in the opened state when the electrically-controlled switch 104 is opened and is not supplying AC power from the AC power source 102. At a first time (t1), the electrically-controlled switch 104 closes which causes power to be supplied by the AC power source 102. For example, in the case where the electrically-controlled switch 104 is a photocontrol apparatus and the load 106 is an LED driver which drives a number of LEDs, a switch (e.g., relay) of the photocontrol apparatus may close upon determining that the ambient light level is below a threshold such that the LEDs are to be turned on to illuminate an area.

As noted above, when the electrically-controlled switch 104 is closed and the bidirectional AC switch 304 is opened, AC current flows through the capacitive load pre-charge circuit 302 to pre-charge the input capacitance of the load 106. The resistance of the capacitive load pre-charge circuit 302 may be selected so that the inrush current to the load 106 is limited to a suitable value dependent on the particular application. For example, the resistance of the capacitive load pre-charge circuit 302 may be selected so that the inrush current to the load 106 is similar to or even less than the rated steady-state input current value for the load 106.

The switch control circuit 306 may retain the bidirectional AC switch 304 in the opened state for a determined delay period or "pre-charge period" after the time (t1) when the electrically-controlled switch 104 was opened. At a time (t2) which is the determined delay period after the time (t1), the switch control circuit 306 controls the bidirectional AC switch 304 to transition into the closed state, which causes the AC current to flow through the bidirectional AC switch 304. Since the bidirectional AC switch 304 has a much lower resistance than the capacitive load pre-charge circuit 302 when the bidirectional AC switch 304 is closed, the closing of the bidirectional AC switch causes the AC current to bypass the capacitive load pre-charge circuit. Thus, the capacitive load pre-charge circuit 302 dissipates power only during the determined pre-charge period (e.g., pre-charge period=t2−t1) and does not dissipate power subsequent to the pre-charge period (i.e., after time (t2)).

The determined pre-charge or delay period may be a duration determined to allow the input capacitance of the load 106 to pre-charge to a sufficient level such that when the bidirectional AC switch 304 is closed the load 106 draws current at a level which does not cause harm to the electrically-controlled switch 104 or other components of the system 200.

Figure 4:
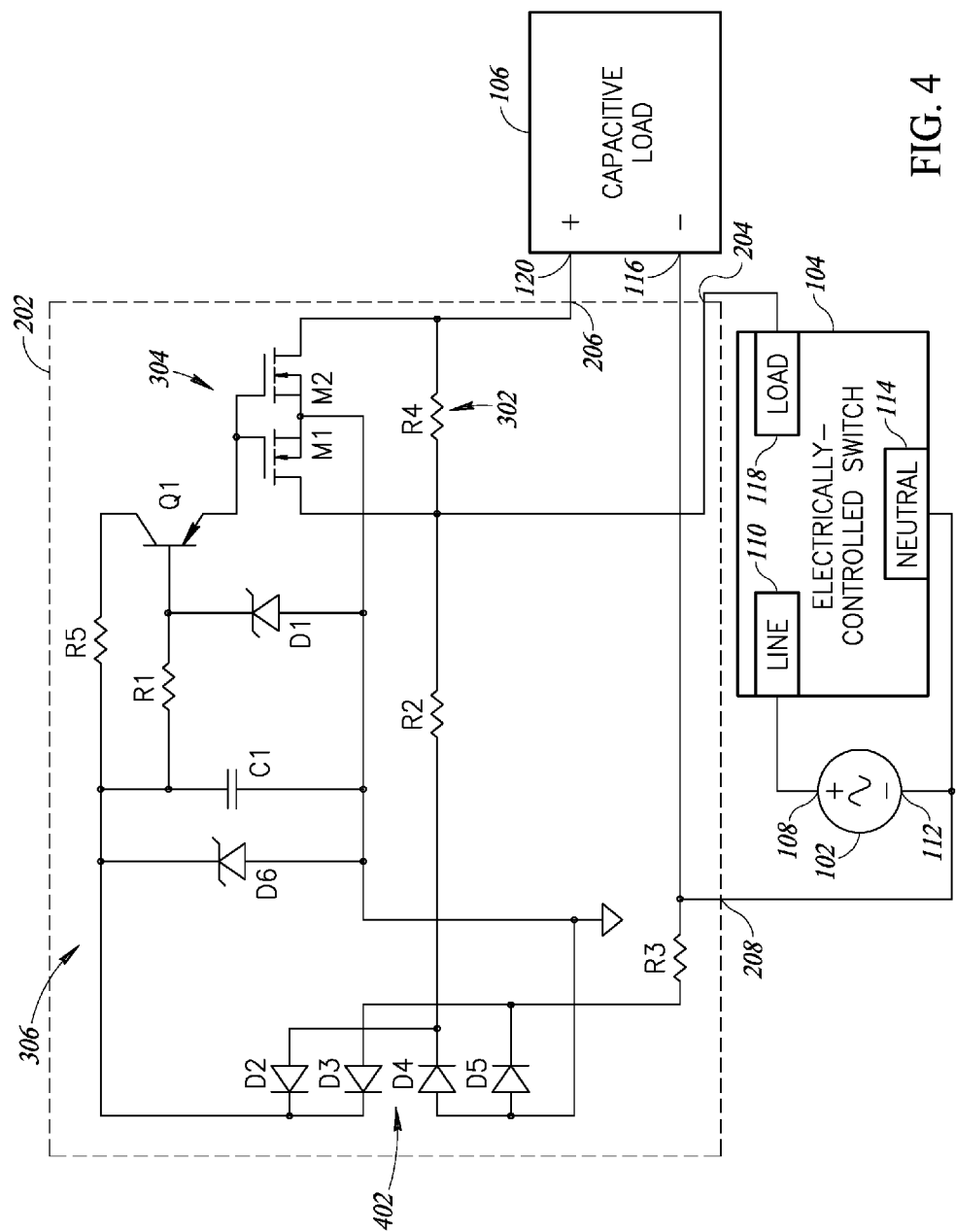
FIG. 4 is a schematic diagram of a protection circuit which protects an electrically-controlled switch from inrush current, according to one illustrated implementation.

FIG. 4 is a schematic diagram of the protection circuit 202 according to one illustrated implementation. The protection circuit 202 includes a resistor R4 which implements the capacitive load pre-charge circuit 302 of FIG. 3. The resistor R4 is electrically coupled in series between the load output node 118 of the electrically-controlled switch 104 and the line input terminal 120 of the load 106. In at least some implementations, the resistor R4 may have a resistance value of 100Ω, for example. In other implementations, the resistor R4 may have a resistance value of 500Ω or less, 300Ω or less, 200Ω or less, 100Ω or less, 30Ω or less, etc. It should be appreciated that the particular resistance value for the resistor R4 may be selected to limit the inrush current drawn by the load 106 to an acceptable value, which value may be dependent on the particular application in which the protection circuit 202 is implemented.

The protection circuit 202 also includes two MOSFETs M1 and M2 which implement the bidirectional AC switch 304. In at least some implementations, the two power MOSFET switches M1 and M2 are arranged for bidirectional conduction by connecting the source terminal of the MOSFET M1 to the source terminal of the MOSFET M2. In the illustrated implementation, the drain terminal of the MOSFET M1 is electrically coupled to the load output node 118 of the electrically-controlled switch 104, and the drain terminal of the MOSFET M2 is electrically coupled to the line input terminal 120 of the load. Thus, the MOSFETs M1 and M2 are arranged in parallel with the resistor R4. As an example, the MOSFET switches M1 and M2 may be Cool-MOS™ C7 Power MOSFETs available from Infineon Technologies AG (e.g., Model No. SPA11N60C3). In at least some implementations, the MOSFET switches M1 and M2 are NMOS enhancement mode MOSFET switches.

The protection circuit 202 also includes the switch control circuit 306 which includes current source resistors R2 and R3 and a bridge rectifier 402 which includes diodes D2, D3, D4 and D5. The current source resistors R2 and R3 may each have a resistance value of 500 kΩ, for example. Each of the diodes D2-D5 may be model MURS360 rectifying diodes available from ON Semiconductor, for example. The switch control circuit 306 also includes a capacitor C1, resistors R1 and R5, zener diodes D1 and D6 and a PNP transistor Q1. The transistor Q1 may be a 2N3906 type PNP transistor available from Fairchild Semiconductor Corp., for example. In at least some implementations, the capacitor C1 has a capacitance value of 1 µF, but such capacitance value may vary dependent on the particular application and delay required by the switch control circuit 306. In at least some implementations the resistors R1 and R5 each have a resistance value of 100 kΩ. In at least some implementations, the zener diode D6 has a reverse zener voltage of 12 volts (e.g., model BZX84C12L available from ON Semiconductor), and the zener diode D1 has a reverse zener voltage of 8.2 volts (e.g., model BZX84C8V2L available from ON Semiconductor).

The operation of the protection circuit 202 is now described. When the electrically-controlled switch 104 is first closed after being in an opened state, the MOSFET switches M1 and M2 are initially turned off, which causes AC current to flow through the capacitive load pre-charge resistor R4 to pre-charge the capacitive load 106 for a period of time. As noted above, the resistance value of the resistor R4 is selected to limit the current drawn by the load 106 to pre-charge the capacitance of the load 106 to a suitable value (e.g., 2 A, 1 A).

While the resistor R4 pre-charges the capacitance of the load 106, current flows from the AC power source 102 through the current source resistors R2 and R3 and is rectified by the bridge rectifier 402, comprising diodes D2-D5, which causes a DC voltage to build up on the capacitor C1. The rate at which voltage builds up on the capacitor C1 depends on the capacitance value of the capacitor C1 as well as the resistance values for the current source resistors R2 and R3. Thus, the source resistors R2 and R3 and the capacitor C1 form an RC delay circuit. The zener diode D6 limits the voltage across the capacitor C1 to a level which is safe for the MOSFETs M1 and M2.

The capacitor C1 is electrically coupled to the base terminal of the transistor Q1 via the resistor R1 and to the collector terminal of the transistor Q1 via the resistor R5. The zener diode D1 is electrically coupled to the base terminal of the transistor Q1 to provide a regulated voltage at the base terminal. The emitter terminal of the transistor Q1 is electrically coupled to each of the gate terminals of the MOSFETs M1 and M2. The zener diode D1 has a lower reverse zener voltage than the zener diode D6, for example 8.2 V instead of 12 V, and thus the base terminal of the PNP transistor Q1 is held below its collector terminal so that the transistor Q1 turns on after the voltage at the capacitor C1 has reached a sufficient level.

When the voltage at the capacitor C1 reaches a sufficient level after the delay period of time discussed above, the transistor Q1 turns on, which causes the MOSFET switches M1 and M2 to turn on and conduct bidirectional current from the AC power source 102 to the load 106. As discussed above, after the MOSFET switches M1 and M2 turn on, current flows through the switches M1 and M2 and substantially ceases to flow through the capacitive load pre-charge resistor R4 since the resistance of the MOSFETs switches M1 and M2 when the switches are turned on is very low (e.g., less than 1Ω) relative to the resistance value of R4 (e.g., 100Ω). Thus, advantageously the capacitive load pre-charge resistor R4 only dissipates power during the pre-charge phase and does not dissipate power during steady-state operation.

As discussed above, the duration of the delay period or "pre-charge phase" may be selected for a particular application dependent on the input capacitance of the load 106 and the desired maximum inrush current value. As discussed above, the inrush current value is limited by the resistance value of the capacitive load pre-charge resistor R4. The duration of the delay period or pre-charge phase may be set by the resistance values of the current source resistors R2 and R3 and the capacitance value of the capacitor C1. In at least some implementations, the delay period is less than one second (e.g., 500 ms, 200 ms, 80 ms), but other durations may also be used dependent on the particular application.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 61/052,924, filed May 13, 2008; U.S. Pat. No. 8,926,138, issued Jan. 6, 2015; PCT Publication No. WO2009/140141, published Nov. 19, 2009; U.S. Provisional Patent Application No. 61/051,619, filed May 8, 2008; U.S. Pat. No. 8,118,456, issued Feb. 21, 2012; PCT Publication No. WO2009/137696, published Nov. 12, 2009; U.S. Provisional Patent Application No. 61/088,651, filed Aug. 13, 2008; U.S. Pat. No. 8,334,640, issued Dec. 18, 2012; U.S. Provisional Patent Application No. 61/115,438, filed Nov. 17, 2008; U.S. Provisional Patent Application No. 61/154,619, filed Feb. 23, 2009; U.S. Patent Publication No. 2010/0123403, published May 20, 2010; U.S. Patent Publication No. 2016/0021713, published Jan. 21, 2016; PCT Publication No. WO2010/057115, published May 20, 2010; U.S. Provisional Patent Application No. 61/174,913, filed May 1, 2009; U.S. Pat. No. 8,926,139, issued Jan. 6, 2015; PCT Publication No. WO2010/127138, published Nov. 4, 2010; U.S. Provisional Patent Application No. 61/180,017, filed May 20, 2009; U.S. Pat. No. 8,872,964, issued Oct. 28, 2014; U.S. Patent Publication No. 2015/0015716, published Jan. 15, 2015; PCT Publication No. WO2010/135575, published Nov. 25, 2010; U.S. Provisional Patent Application No. 61/229,435, filed Jul. 29, 2009; U.S. Patent Publication No. 2011/0026264, published Feb. 3, 2011; U.S. Provisional Patent Application No. 61/295,519, filed Jan. 15, 2010; U.S. Provisional Patent Application No. 61/406,490, filed Oct. 25, 2010; U.S. Pat. No. 8,378,563, issued Feb. 19, 2013; PCT Publication No. WO2011/088363, published Jul. 21, 2011; U.S. Provisional Patent Application No. 61/333,983, filed May 12, 2010; U.S. Pat. No. 8,541,950, issued Sep. 24, 2013; PCT Publication No. WO2010/135577, published Nov. 25, 2010; U.S. Provisional Patent Application No. 61/346,263, filed May 19, 2010; U.S. Pat. No. 8,508,137, issued Aug. 13, 2013; U.S. Pat. No. 8,810,138, issued Aug. 19, 2014; U.S. Pat. No. 8,987,992, issued Mar. 24, 2015; PCT Publication No. WO2010/135582, published Nov. 25, 2010; U.S. Provisional Patent Application No. 61/357,421, filed Jun. 22, 2010; U.S. Pat. No. 9,241,401, granted Jan. 19, 2016; PCT Publication No. WO2011/163334, published Dec. 29, 2011; U.S. Pat. No. 8,901,825, issued Dec. 2, 2014; U.S. Patent Publication No. 2015/0084520, published Mar. 26, 2015; PCT Publication No. WO2012/142115, published Oct. 18, 2012; U.S. Pat. No. 8,610,358, issued Dec. 17, 2013; U.S. Provisional Patent Application No. 61/527,029, filed Aug. 24, 2011; U.S. Pat. No. 8,629,621, issued Jan. 14, 2014; PCT Publication No. WO2013/028834, published Feb. 28, 2013; U.S. Provisional Patent Application No. 61/534,722, filed Sep. 14, 2011; U.S. Pat. No. 9,312,451, issued Apr. 12, 2016; PCT Publication No. WO2013/040333, published Mar. 21, 2013; U.S. Provisional Patent Application No. 61/567,308, filed Dec. 6, 2011; U.S. Pat. No. 9,360,198, issued Jun. 7, 2016; U.S. Provisional Patent Application No. 61/561,616, filed Nov. 18, 2011; U.S. Patent Publication No. 2013/0141010, published Jun. 6, 2013; PCT Publication No. WO2013/074900, published May 23, 2013; U.S. Provisional Patent Application No. 61/641,781, filed May 2, 2012; U.S. Patent Publication No. 2013/0293112, published Nov. 7, 2013; U.S. Patent Publication No. 2013/0229518, published Sep. 5, 2013; U.S. Provisional Patent Application No. 61/640,963, filed May 1, 2012; U.S. Patent Publication No. 2013/0313982, published Nov. 28, 2013; U.S. Patent Publication No. 2014/0028198, published Jan. 30, 2014; U.S. Patent Publication No. 2016/0037605, published Feb. 4, 2016; PCT Publication No. WO2014/018773, published Jan. 30, 2014; U.S. Provisional Patent Application No. 61/723,675, filed Nov. 7, 2012; U.S. Pat. No. 9,301,365, issued Mar. 29, 2016; U.S. Provisional Patent Application No. 61/692,619, filed Aug. 23, 2012; U.S. Patent Publication No. 2014/0055990, published Feb. 27, 2014; U.S. Provisional Patent Application No. 61/694,159, filed Aug. 28, 2012; U.S. Pat. No. 8,878,440, issued Nov. 4, 2014; U.S. Patent Publication No. 2014/0062341, published Mar. 6, 2014; U.S. Patent Publication No. 2015/0077019, published Mar. 19, 2015; PCT Publication No. WO2014/039683, published Mar. 13, 2014; U.S. Provisional Patent Application No. 61/728,150, filed Nov. 19, 2012; U.S. Patent Publication No. 2014/0139116, published May 22, 2014; U.S. Pat. No. 9,433,062, issued Aug. 30, 2016; PCT Publication No. WO2014/078854, published May 22, 2014; U.S. Provisional Patent Application No. 61/764,395, filed Feb. 13, 2013; U.S. Pat. No. 9,288,873, issued Mar. 15, 2016; U.S. Provisional Patent Application No. 61/849,841, filed Jul. 24, 2013; U.S. Patent Publication No. 2015/0028693, published Jan. 29, 2015; PCT Publication No. WO2015/013437, published Jan. 29, 2015; U.S. Provisional Patent Application No. 61/878,425, filed Sep. 16, 2013; U.S. Patent Publication No. 2015/0078005, published Mar. 19, 2015; PCT Publication No. WO2015/039120, published Mar. 19, 2015; U.S. Provisional Patent Application No. 61/933,733, filed Jan. 30, 2014; U.S. Pat. No. 9,185,777, issued Nov. 10, 2015; PCT Publication No. WO2015/116812, published Aug. 6, 2015; U.S. Provisional Patent Application No. 61/905,699, filed Nov. 18, 2013; U.S. Pat. No. 9,414,449, issued Aug. 9, 2016; U.S. Provisional Patent Application No. 62/068,517, filed Oct. 24, 2014; U.S. Provisional Patent Application No. 62/183,505, filed Jun. 23, 2015; U.S. Pat. No. 9,445,485, issued Sep. 13, 2016; PCT Publication No. WO2016/064542, published Apr. 28, 2016; U.S. Provisional Patent Application No. 62/082,463, filed Nov. 20, 2014; U.S. Publication No. 2016/0150369, published May 26, 2016; PCT Publication No. WO2016/081071, published May 26, 2016; U.S. Provisional Patent Application No. 62/057,419, filed Sep. 30, 2014; U.S. Publication No. 2016/0095186, published Mar. 31, 2016; PCT Publication No. WO2016/054085, published Apr. 7, 2016; U.S. Provisional Patent Application No. 62/114,826, filed Feb. 11, 2015; U.S. Non-provisional patent application Ser. No. 14/939,856, filed Nov. 12, 2015; U.S. Provisional Patent Application No. 62/137,666, filed Mar. 24, 2015; U.S. Non-provisional patent application Ser. No. 14/994,569, filed Jan. 13, 2016; U.S. Non-provisional patent application Ser. No. 14/844,944, filed Sep. 3, 2015; U.S. Provisional Patent Application No. 62/208,403, filed Aug. 21, 2015; U.S. Non-provisional patent application Ser. No. 15/238,129, filed Aug. 16, 2016; U.S. Provisional Patent Application No. 62/264,694, filed Dec. 8, 2015; U.S. Provisional Patent Application No. 62/327,939, filed Apr. 26, 2016; U.S. Provisional Patent Application No. 62/379,037, filed Aug. 24, 2016; and U.S. Provisional Patent Application No. 62/397,709, filed on Sep. 21, 2016 and titled "OUTPUT RIPPLE REDUCTION FOR POWER CONVERTERS" are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. An inrush current protection circuit, comprising:
an input terminal electrically coupleable to an output terminal of a control switch, the control switch selectively couples an alternating current (AC) power source to a load;
an output terminal electrically coupleable to the load;
a load pre-charge circuit electrically coupled between the input terminal and the output terminal;
a bidirectional AC switch including a switch input terminal, a switch output terminal, and a switch control terminal, the switch input terminal electrically coupled to the input terminal of the protection circuit and the switch output terminal electrically coupled to the output terminal of the protection circuit such that the bidirectional AC switch is electrically coupled in parallel with the load pre-charge circuit, the bidirectional AC switch having an opened state, in which the bidirectional AC switch has a high resistance which inhibits AC flow, and a closed state, in which the bidirectional AC switch has a low resistance which permits AC flow; and
a switch control circuit electrically coupled to the switch control terminal of the bidirectional AC switch and electrically coupleable to the input terminal of the protection circuit to receive power from the AC power source via the control switch, in operation the switch control circuit:
causes the bidirectional AC switch to be in the opened state while the control switch is open;
detects AC power from the AC power source via the input terminal of the protection circuit due to a closing of the control switch;
responsive to the detection of AC power, causes the bidirectional AC switch to remain in the opened state for a determined delay period which causes current to flow through the load pre-charge circuit; and
causes the bidirectional AC switch to transition from the opened state to the closed state after the determined delay period which causes current to flow through the bidirectional AC switch and to bypass the load pre-charge circuit.

2. The protection circuit of claim 1 wherein the switch control circuit comprises an RC delay circuit which includes at least one resistor and at least one capacitor.

3. The protection circuit of claim 1 wherein the load pre-charge circuit comprises a resistor.

4. The protection circuit of claim 3 wherein the resistor has a resistance value between 20Ω and 300Ω.

5. The protection circuit of claim 1 wherein the bidirectional AC switch comprises two source-connected metal oxide semiconductor field-effect transistors (MOSFETs).

6. The protection circuit of claim 1 wherein the bidirectional AC switch comprises an enhancement mode Metal Oxide Semiconductor Field Effect Transistor (MOSFET).

7. The protection circuit of claim 1 wherein the switch control circuit comprises:
a bridge rectifier comprising a plurality of diodes, the bridge rectifier including a positive terminal and a negative terminal;
a reservoir capacitor electrically coupled between the positive terminal and the negative terminal of the bridge rectifier; and
a zener diode having a cathode electrically coupled to the positive terminal of the bridge rectifier and an anode electrically coupled to the negative terminal of the bridge rectifier.

8. The protection circuit of claim 7 wherein the switch control circuit comprises a transistor which selectively conducts current when a voltage across the reservoir capacitor reaches a determined voltage value.

9. The protection circuit of claim 8 wherein the transistor is a PNP type bipolar junction transistor which has a base terminal, a collector terminal and an emitter terminal, the base terminal coupled to the positive terminal of the bridge rectifier via a first resistor, the collector terminal coupled to the positive terminal of the bridge rectifier via a second resistor, and the emitter terminal coupled to the switch control terminal of the bidirectional AC switch.

10. The protection circuit of claim 9 wherein the switch control circuit comprises a zener diode having a cathode electrically coupled to the base terminal of the PNP type bipolar junction transistor and an anode electrically coupled to the negative terminal of the bridge rectifier.

11. The protection circuit of claim 7 wherein the reservoir capacitor has a capacitance value between 0.1 microfarads (µF) and 10 µF.

12. The protection circuit of claim 7 wherein the negative terminal of the bridge rectifier is electrically coupled to the AC power source via a first resistor, and the positive terminal of the bridge rectifier is electrically coupled to the control switch via a second resistor.

13. The protection circuit of claim 1 wherein the control switch comprises a photocontrol or a lighting control contactor.

14. The protection circuit of claim 1 wherein the load comprises a driver circuit for a solid state lighting system.

15. An inrush current protection circuit, comprising:
an input terminal electrically coupleable to an output terminal of a control switch, the control switch selectively couples an alternating current (AC) power source to a load;
an output terminal electrically coupleable to the load;
a load pre-charge resistor electrically coupled between the input terminal and the output terminal;
a bidirectional AC switch which includes two source-connected metal oxide semiconductor field-effect transistors (MOSFETs), a drain of a first one of the two MOSFETs defining a switch input terminal, a drain of a second one of the two MOSFETs defining a switch output terminal, and gates of the two MOSFETs electrically coupled together to define a switch control terminal, the switch input terminal electrically coupled to the input terminal of the protection circuit and the switch output terminal electrically coupled to the output terminal of the protection circuit such that the bidirectional AC switch is electrically coupled in parallel with the load pre-charge resistor, the bidirectional AC switch having an opened state and a closed state; and
a switch control circuit electrically coupled to the switch control terminal of the bidirectional AC switch and electrically coupleable to the input terminal of the protection circuit to receive power from the AC power source via the control switch, in operation the switch control circuit:
causes the bidirectional AC switch to be in the opened state while the control switch is open;

detects AC power from the AC power source via the input terminal of the protection circuit due to a closing of the control switch;

responsive to the detection of AC power, causes the bidirectional AC switch to remain in the opened state for a determined delay period which causes current to flow through the load pre-charge resistor; and causes the bidirectional AC switch to transition from the opened state to the closed state after the determined delay period which causes current to flow through the bidirectional AC switch and to bypass the load pre-charge resistor.

16. The protection circuit of claim 15 wherein the switch control circuit comprises an RC delay circuit which includes at least one resistor and at least one capacitor.

17. The protection circuit of claim 15 wherein the load pre-charge resistor has a resistance value between 20Ω and 300 Ω.

18. The protection circuit of claim 15 wherein each of the MOSFETs comprises an enhancement mode MOSFET.

19. The protection circuit of claim 15 wherein the switch control circuit comprises:
a bridge rectifier comprising a plurality of diodes, the bridge rectifier including a positive terminal and a negative terminal;
a reservoir capacitor electrically coupled between the positive terminal and the negative terminal of the bridge rectifier; and
a zener diode having a cathode electrically coupled to the positive terminal of the bridge rectifier and an anode electrically coupled to the negative terminal of the bridge rectifier.

20. The protection circuit of claim 19 wherein the switch control circuit comprises a transistor which selectively conducts current when a voltage across the reservoir capacitor reaches a determined voltage value.

21. The protection circuit of claim 20 wherein the transistor is a PNP type bipolar junction transistor which has a base terminal, a collector terminal and an emitter terminal, the base terminal coupled to the positive terminal of the bridge rectifier via a first resistor, the collector terminal coupled to the positive terminal of the bridge rectifier via a second resistor, and the emitter terminal coupled to the switch control terminal of the bidirectional AC switch.

22. The protection circuit of claim 21 wherein the switch control circuit comprises a zener diode having a cathode electrically coupled to the base terminal of the PNP type bipolar junction transistor and an anode electrically coupled to the negative terminal of the bridge rectifier.

23. The protection circuit of claim 19 wherein the reservoir capacitor has a capacitance value between 0.1 microfarads (µF) and 10 µF.

24. The protection circuit of claim 19 wherein the negative terminal of the bridge rectifier is electrically coupled to the AC power source via a first resistor, and the positive terminal of the bridge rectifier is electrically coupled to the control switch via a second resistor.

25. The protection circuit of claim 15 wherein the control switch comprises a photocontrol or a lighting control contactor.

26. The protection circuit of claim 15 wherein the load comprises a driver circuit for a solid state lighting system.

* * * * *